July 11, 1967 W. E. BLUME 3,330,533
TWISTED HOOK TERMINAL FOR RODING DUCTS
Filed July 19, 1965 2 Sheets-Sheet 1
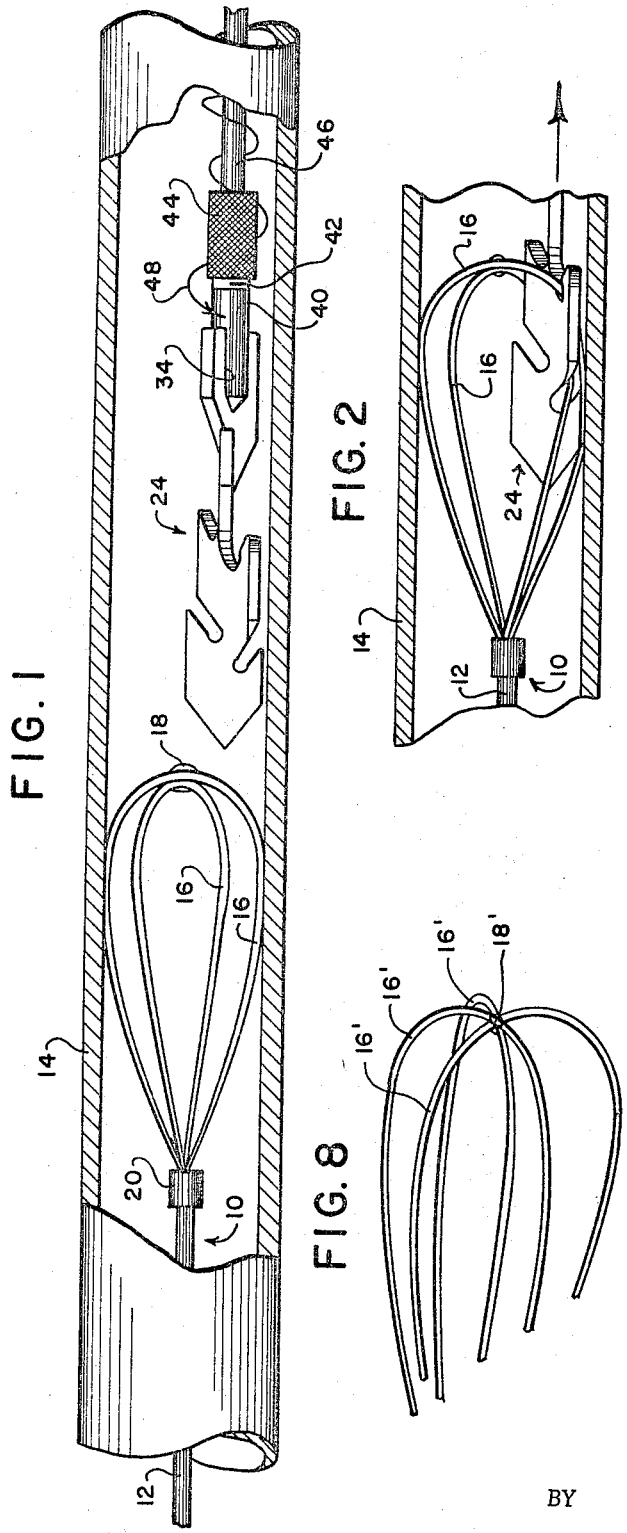
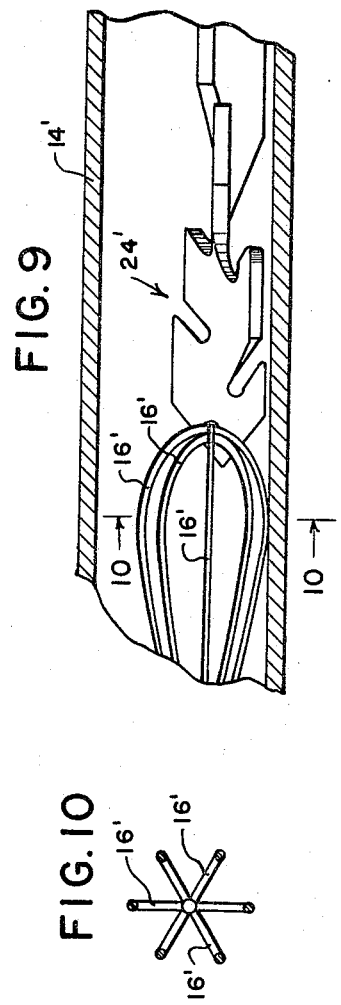
INVENTOR
WILLIAM E. BLUME
BY Polachek & Saulsbury
ATTORNEYS

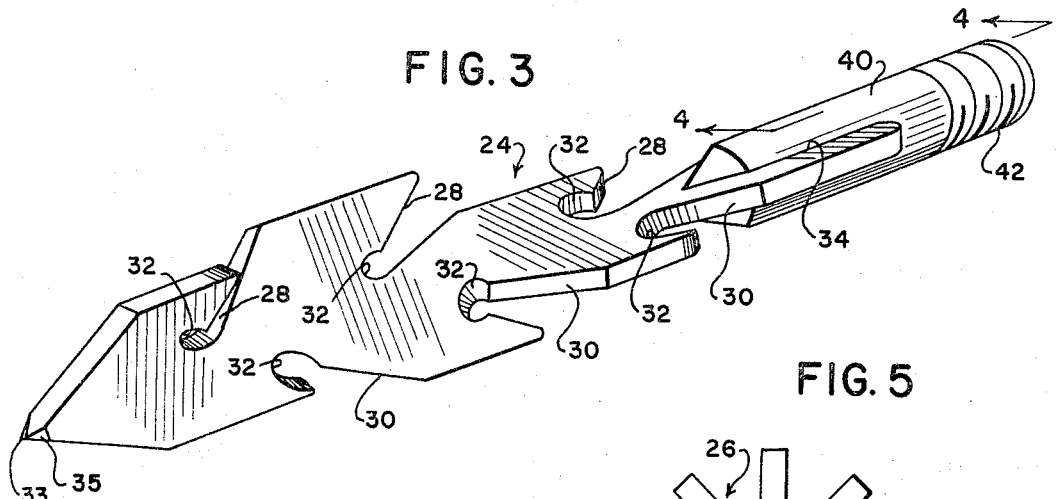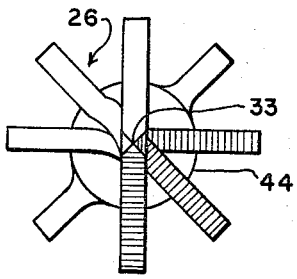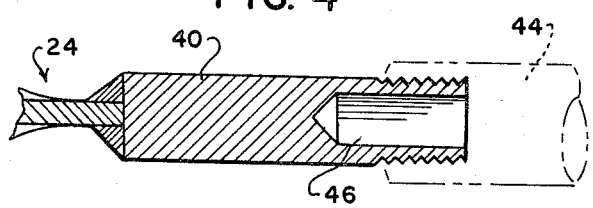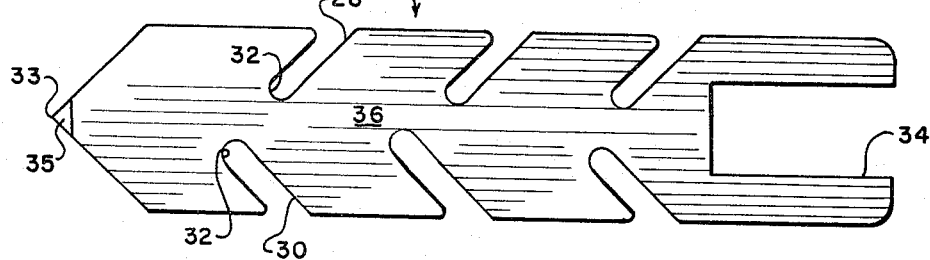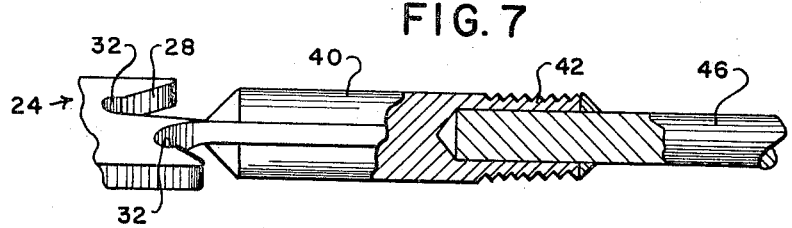

United States Patent Office 3,330,533
Patented July 11, 1967

3,330,533
TWISTED HOOK TERMINAL FOR RODING DUCTS
William E. Blume, 126—13 101st Ave.,
Richmond Hill, N.Y. 11419
Filed July 19, 1965, Ser. No. 473,144
5 Claims. (Cl. 254—134.3)

This invention relates specifically to a fish tape and a pulling device.

A principal object of the present invention is to provide a novel and improved fish tape which may be pulled through a relatively long conduit by inserting the fish tape through one end of the conduit and by inserting a novel pulling device through the opposite end of the conduit and engaging the fish tape, the fish tape being provided with means for facilitating the engagement of the pulling device.

A further object of the invention resides in the structure of a plate-like pulling device with slots therein to engage the fish tape.

Another object of the invention is to provide a novel and improved fish tape provided with specific means for enabling the fish tape to be snagged when it becomes jammed in a conduit.

Still another object is to provide a pulling device for a fish tape that is provided with hooks and slippage surfaces to facilitate automatic engagement of the hooks with the fish tape.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a sectional view through a conduit showing the manner in which an improved pulling device or snagger according to the invention is employed to facilitate pulling an improved fish tape through the conduit.

FIG. 2 is a fragmentary sectional view showing the manner in which a hook portion of the pulling device is engaged with the looped end of the fish tape preliminary to pulling the fish tape through the conduit.

FIG. 3 is a perspective view of the pulling device or snagger on an enlarged scale.

FIG. 4 is a sectional view taken on the line 4—4 of FIG. 3, a fish tape being shown in dot-dash lines.

FIG. 5 is an end view looking from the left of FIG. 3.

FIG. 6 is a plan view of the preformed blank from which the body of the pulling device was formed.

FIG. 7 is a view similar to FIG. 4 turned 45°.

FIG. 8 is a perspective view of a portion of a modified form of loop extension.

FIG. 9 is a view similar to FIG. 2 showing the pulling device in position about to engage the looped end of the fish tape, and FIG. 10 is a cross sectional view taken on the line 10—10 of FIG. 9, parts being omitted.

Referring now to the various views of the drawings in detail, a fish tape 10 is shown formed with a spring steel ribbon-like body 12 sufficiently long and flexible and of sufficient stiffness to be pulled a substantial distance through a conduit, for example, an electric conduit 14. In accordance with the present invention, a tapered loop shaped extension is added to the inner end of the body 12, which extension consists of two looped wires 16, 16 bent upon themselves, overlapped and spot welded as indicated at 18 and connected at the narrow end to the end of the ribbon body 12 by means of an anchorage sleeve 20. The looped extension occupies the entire area of the conduit as seen in FIG. 1.

The invention contemplates providing a pulling or snagging device 24 for engaging the crossed ends of the wires and pulling the fish tape through the conduit. The pulling or snagging device 24 is formed from a substantially rectangular flat metal casting or plate 26 shown in FIG. 6 having pairs of slots intersecting the long edges thereof and extending inwardly and at an obtuse angle to the long edges. The slots 28 on one side are slightly offset from the slots 30 on the other side and all the slots are formed with enlarged notches 32 on the inner ends thereof slightly offset from the axes of the slots. At one end, the body is formed with a rectangular shaped recess 34 intersecting said one end, and at the other end, the body is tapered to a point 33 with opposed bevelled surfaces 35. The body between the inner ends of the slots is provided with a central solid portion 36, which is twisted at points A, B and C between the inner ends of the pairs of slots 28 and 30, leaving the portions of the body between A and B positioned at an angle offset 45° from the portion of the body outwardly of A and leaving said portion between A and B positioned at an angle offset 45° from the portion between B and C and the slotted end portion as seen in FIGS. 3 and 5. The edges of the recess 34 are welded to opposed sides of a shank 40 having a threaded and slotted end 42 for attachment to a sleeve member 44 and elongated cylindrical body 46 of another fish tape, which is slidably and rotatably mounted in the conduit 14 as indicated by the arrow 48 in FIG. 1.

In FIGS. 8 to 10, inclusive, a modified form of loop extension for the body 12' of fish tape 10' is shown. This loop extension is composed of three looped wires 16' instead of two looped wires as in FIG. 1. The three looped wires cross each other and are connected by means such as spot welded as indicated at 18'. The three looped wires present more area for engagement by the pulling or snagging device 24'.

In use, the pulling or snagging device 24 or 24' is pushed against the looped extension of the fish tape 10 or 10' and the bevelled surfaces 34 of the pointed end of the body of the pulling device will cause the pointed end to slide off the wire and proceed into the looped extension and withdrawal movement of the pulling or snagging device in the direction of the arrow in FIG. 2 will cause one of the slots 28 or 30 to hook onto a wire 16 or 16', the wire slipping into the notch 32, permitting the fish tape to be pulled outwardly of the conduit. The sliding and turning movements of the pulling or snagging device 24 facilitate interlock with the wire extension of the fish tape.

While I have illustrated and described the now preferred embodiments of my invention, it is to be understood that I do not limit myself to the precise construction herein disclosed and that various changes and modifications may be made within the scope of the invention as defined in the appended claims.

What is claimed is:

1. In combination, a fish tape comprising an elongated flexible ribbon-like member of sufficient stiffness to be pushed through a conduit, a plurality of elongated loops of resilient wire-like material and a sleeve member engaged around portions of said loops and holding said portions bound together in closely adjacent relationship, said sleeve member and said loops being anchored to the inner end of said ribbon-like member forming an extension thereof, the resilient loops of wire-like material being yieldable sufficiently to be pushed through a conduit with the fish tape in one direction, another fish tape having an elongated flexible round cylindrical body and a longitudinally twisted plate-like pulling device fastened to one end of said cylindrical body, said pulling device having spaced slots between the twisted portions, said twisted portions and slots defining hook means adapted selectively to engage one of the loops of wire-like material, when said latter fish tape is rotatably pushed through the conduit from the opposite direction.

2. In combination, a fish tape comprising an elongated flexible ribbon-like member of sufficient stiffness to be pushed through a conduit, a plurality of elongated loops of resilient wire-like material and a sleeve member engaged around portions of said loops and holding said portions bound together in closely adjacent relationship, said sleeve member and said loops being anchored to the inner end of said ribbon-like member forming an extension thereof, the resilient loops of wire-like material being yieldable sufficiently to be pushed through a conduit with the fish tape in one direction, another fish tape having an elongated flexible round cylindrical body and a plate-like pulling device fastened to one end of said cylindrical body, said pulling device having an elongated twisted body with pairs of opposed slots between the twisted portions of the body, said slots and said twisted portions defining hook means adapted selectively to engage one of the loops of wire-like material when said latter fish tape is rotatably pushed through the conduit from the opposite direction.

3. In combination, a fish tape comprising an elongated flexible ribbon-like member of sufficient stiffness to be pushed through a conduit, a plurality of elongated loops of resilient wire-like material and a sleeve member engaged around portions of said loops and holding said portions bound together in closely adjacent relationship, said sleeve member and said loops being anchored to the inner end of said ribbon-like member forming an extension thereof, the resilient loops of wire-like material being yieldable sufficiently to be pushed through a conduit with the fish tape in one direction, another fish tape having an elongated flexible round cylindrical body and a plate-like pulling device fastened to one end of said cylindrical body, said pulling device having an elongated twisted body with pairs of opposed slots between the twisted portions of the body, said slots and said twisted portions defining hook means adapted selectively to engage one of the loops of wire-like material when said latter fish tape is rotatably pushed through the conduit from the opposite direction, wherein the inner ends of the slots are formed with enlarged notches extending laterally of the axes of the slots and serving as seats for the loops of wire-like material.

4. A fish tape comprising an elongated flexible cylindrical body of sufficient stiffness to be rotatably pushed through a conduit, and a pulling device fastened to one end of said cylindrical body, said pulling device having an elongated plate-like twisted body with pairs of opposed slots between the twisted portions of the body when the body is pushed through a conduit in one direction, said slots and said twisted portions defining hook means adapted selectively to engage the wire loops of another fish tape pushed through the conduit from the opposite direction.

5. As an article of manufacture, an attachment for a fish tape comprising an elongated metal rectangular shaped flat body having a longitudinally twist therein and formed with pairs of slots along the long edges thereof defining the twisted portions, said slots and twisted portions defining hook means, the inner ends of the slots being notched, extending laterally relative to the axes of the slots and serving as seats to receive wire loops, one end of the body being tapered to a point, the other end of the body having a shank for connection to the end of a body of a fish tape.

References Cited
UNITED STATES PATENTS

| | | | |
|---|---|---|---|
| 834,135 | 10/1906 | Hymes | 15—104.3 |
| 1,658,887 | 2/1928 | Dotzauer | 254—143.3 |
| 1,864,617 | 6/1932 | Ree | 15—104.3 |
| 3,035,817 | 5/1962 | Wilson | 254—134.3 |
| 3,224,732 | 12/1965 | Williams | 254—134.3 |

OTHELL M. SIMPSON, *Primary Examiner.*